March 12, 1968  C. W. KRYSTYNIAK  3,373,119
TERNARY METALLIC OXIDE AGGLOMERATE AND METHOD OF PREPARATION
Filed Dec. 1, 1965
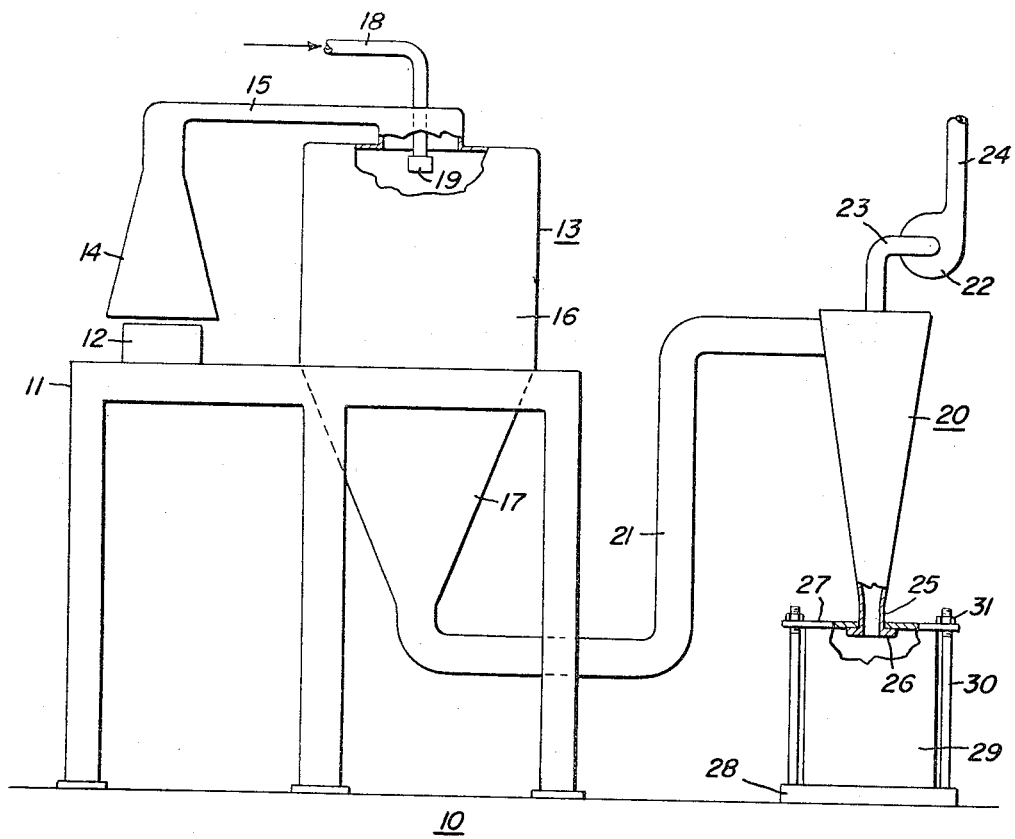
Inventor:
Casimir W. Krystyniak,
by Paul R. Webb, II
His Attorney.

United States Patent Office 3,373,119
Patented Mar. 12, 1968

3,373,119
TERNARY METALLIC OXIDE AGGLOMERATE
AND METHOD OF PREPARATION
Casimir W. Krystyniak, Schenectady, N.Y., assignor to
General Electric Company, a corporation of New York
Filed Dec. 1, 1965, Ser. No. 510,886
2 Claims. (Cl. 252—517)

This invention relates to metallic oxide powders and to methods of preparation, and more particularly to metallic oxide powders comprising spherical agglomerate particles and to methods of preparation of such powders.

A metallic oxide powder, which is blended together from a mixture of particles of several metallic oxides, segregates into component oxides with a resulting non-uniformity of the powder. Such a powder comprises plate-like or needle-like particles which restrict its free-flowing characteristics. Thus, it would be desirable to provide a metallic oxide powder which is an intimate mixture of component metallic oxides and which exhibits free-flowing characteristics.

When a metallic oxide powder is to be employed for a particular purpose, a specific, uniform composition is important to provide the necessary properties in the material produced from the powder. Such a powder should also be free-flowing to effect an efficient use of the powder and to prevent non-uniformity of the powder. Metallic oxide powders of the present invention comprise spherical agglomerate particles of component metallic oxides whereby the powder is of a uniform composition and is free-flowing. Such powders are particularly suitable for forming solid electrolytes and solid electrodes for high temperature fuel cells.

It is an object of my invention to provide an improved metallic oxide power.

It is another object of my invention to provide an improved metallic oxide powder consisting of spherical agglomerate particles.

It is a further object of my invention to provide an improved method of preparing a metallic oxide powder.

In carrying out my invention in one form, a metallic oxide powder comprises spherical agglomerate particles consisting of a metallic oxide powder characterized by oxygen-ion conductivity upon stabilization, and a stabilizing metallic oxide powder.

These and various other objects, features and advantages of the invention will be better understood from the following description taken in connection with the accompanying drawing in which:

The single figure is a side elevational view of an apparatus for preparing metallic oxide powders embodying my invention.

In the single figure of the drawing spray drying apparatus is shown generally at 10 which comprises a stand 11 of any suitable construction providing support for a heater 12 and a drying chamber 13. Heater 12, which is of any suitable construction such as a gas or an electric heater, provides heat for air in the surrounding atmosphere which is drawn into a hood 14 positioned above the heater. Hood 14 is connected by a duct 15 to the upper wall of drying chamber 13 which has an upper portion 16 and a lower conical portion 17. A feed line 18 extends through the upper wall of duct 15 and terminates in an atomizing nozzle 19. In this manner, nozzle 19 is positioned below the outlet of duct 15 and within the upper portion 16 of drying chamber 13.

Lower conical portion 17 of drying chamber 13 is connected to a cyclone collector 20 by a duct 21. A blower 22 is connected to collector 20 by a duct 23 and to the atmosphere by an exhaust duct 14. The outlet end 25 of cyclone collector 20 is provided with a flange 26. A cover plate 27 with a central aperture is positioned on flange 26. A base plate 28 supports a removable glass container 29 thereon. Rods 30 extend upwardly from base plate 28 and project through associated openings around the periphery of cover plate 27. Nuts 31 are threaded onto the threaded upper ends of rods 30 to retain cover plate 27 on the upper open end of container 29.

Spray-drying apparatus 10 which is shown in FIGURE 1 in the drawing and described above is suitable for the preparation of a metallic oxide powder embodying my invention. Various modifications of the apparatus shown in the single figure of the drawing may also be employed in the preparation of such metallic oxide powder.

I found that a very satisfactory metallic oxide powder with uniform properties and free-flowing characteristics comprises spherical agglomerate particles consisting of a metallic oxide powder characterized by oxygen-ion conductivity upon stabilization, and a stabilizing metal oxide powder. Another very suitable metallic oxide powder comprises spherical agglomerate particles consisting of a metallic oxide powder characterized by oxygen-ion conductivity upon stabilization, a stabilizing metal oxide powder, and a metallic oxide powder selected from the group consisting of iron oxide, cobalt oxide, nickel oxide, titanium oxide, zinc oxide, titanium oxide-iron oxide, zinc oxide-iron oxide, and zinc oxide-lead oxide.

A further very satisfactory metallic oxide powder comprises spherical agglomerate particles consisting of a metal oxide powder characterized by oxygen-ion conductivity upon stabilization, a stabilizing metallic oxide powder, and a metallic oxide powder consisting of 2 weight percent to 40 weight percent of uranium dioxide. A still further very satisfactory metallic oxide powder comprises spherical agglomerate particles consisting of a metallic oxide powder characterized by oxygen ion conductivity upon stabilization, a stabilizing metallic oxide powder, a metallic oxide consisting of 2 weight percent to 40 weight percent of uranium dioxide, and a metallic oxide powder selected from the group consisting of iron-oxide, cobalt oxide, nickel oxide, titanium oxide, zinc oxide, titanium oxide-iron oxide, zinc oxide-iron oxide, and zinc oxide-lead oxide.

The principal metallic oxides which are characterized by oxygen-ion conductivity upon stabilization are zirconia and thoria. Each of these metallic oxides serves as an oxygen-ion transport medium by virtue of the anion vacancies generated in the metallic oxide structure upon cationic substitution of metal from the stabilizing metallic oxide for metal of the initial metallic oxide. Upon stabilization, the metallic oxide is resistant to large volume changes upon thermally cycling and hence is mechanically stable. The stabilized metallic oxide becomes a low resistance ionic conductor.

The stabilizing metallic oxide comprises at least one or a combination of several specific oxides such as calcium oxide, yttrium oxide, ytterbium oxide or a mixture of rare-earth oxides. For examples, a suitable metallic oxide material comprises zirconia which is stabilized with 15 molecular percent calcium oxide. Other compositions of stabilized zirconia are shown for example in "Oxide Ceramics" by Ryshkewitch, Academic Press, 1960, particularly on pages 354, 364, and 376 thereof. When thoria, a metallic oxide characterized by oxygen-ion conductivity upon stabilization, is stabilized by the addition of one or more of the above stabilizing metallic oxides, the stabilized thoria is referred to as "doped thoria" rather than "stabilized thoria." For example, a suitable doped thoria consists of thoria which is doped with the addition of 4 molecular percent calcium oxide.

The metallic oxide powder selected from the group consisting of iron oxide, cobalt oxide, nickel oxide, titanium oxide, zinc oxide, titanium oxide-iron oxide, zinc oxide-iron oxide, and zinc oxide-lead oxide provides material with electronic conductivity which when it is added to the stabilized metallic oxide powder provides a mixed conducting oxide powder. Such powder has both ionic and electronic conductivity. Such powder is particularly suitable for forming solid electrodes for a high temperature fuel cell. The addition of a metallic oxide powder of 2 weight percent to 40 weight percent uranium dioxide to a stabilized metallic oxide powder provides a mixed conducting oxide powder with both ionic and electronic conductivity, which electronic conductivity is provided in the powder by the uranium dioxide.

When a metallic oxide powder of 2 weight percent of 40 weight percent uranium dioxide and a metallic oxide selected from the above metallic oxide group are added to the stabilized metallic oxide powder, such powder is a mixed conducting oxide powder. Both uranium dioxide and the metal dioxide selected from the above group provide electronic conductivity while the stabilized metallic oxide provides ionic conductivity. Both of these metallic oxide powders are also particularly suitable for forming solid electrodes for high temperature fuel cell.

From a metallic oxide power selected from the above group it is preferred to employ iron oxide and to employ such iron oxide, which includes $Fe_3O_4$, $FeO$, and $Fe_2O_3$, in an amount from 2 weight percent to 20 weight percent $Fe_3O_4$, or an equivalent amount of iron introduced as $Fe_2O_3$, or $FeO$. Uranium dioxide is preferred in an amount from 2 weight percent to 40 weight percent of the total metallic oxide powder.

I found further that metallic oxide powders of the above types exhibit superior properties when these powders comprise spherical agglomerate particles. Such a metallic oxide powder comprising spherical agglomerate particles of component metallic oxides produces a powder of uniform composition and with free-flowing characteristics.

I found further that metallic oxide powders with the above component metallic oxides were prepared by providing the component metallic oxides, blending these component oxides, preparing a slurry of the blended oxide powders, spray-drying the slurry thereby producing a powder with spherical agglomerate particles, and collecting the spray-dried powder. My method results in a superior metallic oxide powder which has spherical agglomerate particles of component metallic oxides. My method produces a metallic oxide powder with a specific, uniform composition and free-flowing characteristics which prevents also non-uniformity of the powder.

In the preparation of the metallic oxide powder in accordance with my method, apparatus which is shown for example in the single figure of the drawing is employed in the process. A metallic oxide powder characterized by oxygen-ion conductivity upon stabilization, such as zirconia, is blended with a stabilizing metallic oxide powder such as calcia. A slurry of these blended oxide powders is then prepared. In the preparation of such a slurry, a liquid comprising water, alcohol and an organic binder is added to the blended oxide powders to provide the slurry. The slurry of the blended oxide powders and liquid is then spray dried by equipment, for example, such as shown in the single figure of the drawing.

Such a slurry is fed through feed line 18 and sprayed through atomizing nozzle 19 into the upper portion 16 of spray drying chamber 13. Prior to feeding the slurry into feed line 18, heater 12 is turned on and blower 22 is operated. In this manner, blower 22 draws air from the atmosphere past heater 12 into duct 14, and into spray drying chamber 13. The air is further drawn by blower 22 through duct 21, into the upper portion of cyclone collector 20, into duct 23 and then into the atmosphere or to a suitable outlet by means of exhaust duct 24. Blower 22 creates a slight vacuum in the system and in this manner prevents the escape of powder. While the heated air is drawn through the system, the above-mentioned slurry is fed through feed line 18 and atomizing nozzle 19 into upper portion 16 of drying chamber 13. The air flow is turbulent, co-current and downward into chamber 13 from the outlet of duct 15 to give high drying efficiency and low chamber wall temperature. This heated air dries the slurry thereby producing a metallic oxide powder with spherical agglomerate particles. These particles are drawn through duct 21 and collected by means of cyclone collector 20 which feeds the particles into container 29.

After collection of the spray-dried powder, blower 22 is turned off, heater 12 is turned off, and feed line 18 is closed off by an appropriate valve (not shown). Bolts 31 are then unthreaded from the threaded ends of rods 30, and cover plate 27 is pushed upwardly from the upper surface of flange 26 so that the container 29 is removed from its base 28. The spray-dried powder can then be retained in this container by employing a cover for the container or can be transferred to another covered container. The collected spray-dried powder comprises spherical agglomerate particles of component metallic oxides which powder has a uniform composition and free-flowing characteristics.

Examples of metallic oxide powder embodying my invention and methods of preparing these powders are as follows:

Table I sets forth below various component metallic oxide powders which are blended together in a blender or otherwise mixed together to form a blended metallic oxide powder.

TABLE I

| Number: | Weight percent of powder |
|---|---|
| 1 | 85.0 $ZrO_2$, 15.0 $CaO$. |
| 2 | 86.0 $ZrO_2$, 14.0 $CaO$. |
| 3 | 85.0 $ZrO_2$, 15.0 $Y_2O_3$. |
| 4 | 81.0 $ZrO_2$, 19.0 $Y_2O_3$. |
| 5 | 73.8 $ZrO_2$, 26.2 $Yb_2O_3$. |
| 6 | 96.0 $ThO_2$, 4 $CaO$. |
| 7 | 96.0 $ThO_2$, 4 $Y_2O_3$. |
| 8 | 83.0 $ZrO_2$, 15.0 $Y_2O_3$, 2.0 $Fe_3O_4$. |
| 9 | 81.0 $ZrO_2$, 14.5 $Y_2O_3$, 4.5 $Fe_3O_4$. |
| 10 | 76.5 $ZrO_2$, 13.5 $CaO$, 10.0 $Fe_3O_4$. |
| 11 | 77.5 $ZrO_2$, 12.5 $Y_2O_3$, 10.0 $Fe_3O_4$. |
| 12 | 69.0 $ZrO_2$, 11.0 $Y_2O_3$, 20 $Fe_3O_4$. |
| 13 | 69.7 $ZrO_2$, 13.6 $CaO$, 16.7 $Fe_3O_4$. |
| 14 | 69.7 $ZrO_2$, 13.6 $CaO$, 16.7 $CoO$. |
| 15 | 69.7 $ZrO_2$, 13.6 $CaO$, 16.7 $ZnO$. |
| 16 | 67.5 $ZrO_2$, 15.0 $Y_2O_3$, 7.5 $TiO_2$, 10.0 $Fe_3O_4$. |
| 17 | 76.0 $ZrO_2$, 10.0 $Y_2O_3$, 3.5 $ZnO$, 10.5 $Fe_3O_4$. |
| 18 | 83.5 $ZrO_2$, 14.5 $CaO$, 2.0 $UO_2$. |
| 19 | 68.0 $ZrO_2$, 12.0 $Y_2O_3$, 20.0 $UO_2$. |
| 20 | 57.5 $ZrO_2$, 14.5 $Y_2O_3$, 28.0 $UO_2$. |
| 21 | 59.5 $ZrO_2$, 10.5 $CaO$, 30.0 $UO_2$. |
| 22 | 51.0 $ZrO_2$, 9.0 $CaO$, 40.0 $UO_2$. |
| 23 | 72.25 $ZrO_2$, 12.75 $CaO$, 10.0 $UO_2$, 5.0 $Fe_3O_4$. |
| 24 | 63.75 $ZrO_2$, 11.25 $CaO$, 20.0 $UO_2$, 5.0 $Fe_3O_4$. |
| 25 | 63.75 $ZrO_2$, 11.25 $Y_2O_3$, 20.0 $UO_2$, 5.0 $Fe_3O_4$. |

A slurry is prepared of each of the blended metallic oxide powders set forth above in Table I. The slurry is preferably at least 60 weight percent solids and up to 40 weight percent liquid when the stablizing metallic oxide powder is calcium oxide. However, the slurry is preferably at least 52 weight percent solids and up to 48 weight percent liquid when the stabilizing metallic oxide is yttrium oxide.

The liquid comprises from 100 weight percent to 35 weight percent water, and from 0 weight percent to 65 weight percent alcohol, such as denatured alcohol. Additionally, it is desirable to add an organic binder in the liquid in an amount from 1.5 weight percent to 2.25 weight percent. A suitable binder is "Methocel," which is methyl cellulose produced by Dow Chemical Company, Midland, Michigan. It is also desirable to add 1.0 weight percent to 30 weight percent triethanolamine. I found it to be desirable to add 1.0 weight percent to 3.0 weight percent ammonia.

Table II sets forth below slurries which are prepared of each of the blended powders set forth above in Table I. Under the heading "100% liquid content," the weight percents are set forth by numbers 1–5 which identify contents as follows: 1—water, 2—alcohol, 3—triethanolamine, 4—ammonia, and 5—binder ("Methocel").

TABLE II

| Number | Wt. Percent Powder | Wt. Percent Liquid | 100% Liquid Content, Wt. Percent | | | | |
|---|---|---|---|---|---|---|---|
| | | | 1 | 2 | 3 | 4 | 5 |
| 1 | 65 | 35 | 95 | | 3.0 | | 2.0 |
| 2 | 70 | 30 | 95 | | 3.0 | | 2.0 |
| 3 | 53 | 47 | 37 | 59.75 | 1.0 | | 2.25 |
| 4 | 53 | 47 | 37 | 59.75 | 1.0 | | 2.25 |
| 5 | 53 | 47 | 35 | 60.5 | 1.25 | 1.25 | 2.0 |
| 6 | 50 | 50 | 93 | | 3.0 | | 4.0 |
| 7 | 50 | 50 | 93 | | 3.0 | | 4.0 |
| 8 | 65 | 35 | 49 | 49.0 | | | 2.0 |
| 9 | 55 | 45 | 36 | 58.7 | | | 2.0 |
| 10 | 65 | 35 | 36 | 58.7 | 1.3 | | 2.0 |
| 11 | 65 | 35 | 36 | 58.7 | 1.3 | | 2.0 |
| 12 | 65 | 35 | 36 | 58.7 | 1.3 | | 2.0 |
| 13 | 65 | 35 | 36 | 58.7 | 1.3 | | 2.0 |
| 14 | 65 | 35 | 36 | 58.7 | 1.3 | | 2.0 |
| 15 | 65 | 35 | 36 | 58.7 | 1.3 | | 2.0 |
| 16 | 65 | 35 | 36 | 58.7 | 1.3 | | 2.0 |
| 17 | 65 | 35 | 36 | 58.7 | 1.3 | | 2.0 |
| 18 | 53 | 47 | 36.3 | 58.7 | 1.5 | 1.5 | 2.0 |
| 19 | 52 | 48 | 38 | 56.0 | 2.0 | 2.0 | 2.0 |
| 20 | 52 | 48 | 38 | 56.0 | 2.0 | 2.0 | 2.0 |
| 21 | 52 | 48 | 38 | 56.0 | 2.0 | 2.0 | 2.0 |
| 22 | 52 | 48 | 38 | 56.0 | 2.0 | 2.0 | 2.0 |
| 23 | 53 | 47 | 37 | 59.75 | 1.0 | | 2.25 |
| 24 | 53 | 47 | 37 | 59.75 | 1.0 | | 2.25 |
| 25 | 53 | 47 | 37 | 59.75 | 1.0 | 11 | 2.25 |

Each of the above slurries in Table II is spray-dried in the apparatus as shown in the single figure of the drawing and as described above. Each of the spray-dried slurries produces a powder with spherical agglomerate particles which is collected as described above.

While other modifications of this invention and variations thereof which may be employed within the scope of the invention have not been described, the invention is intended to include such as may be embraced within the following claims.

What I claim as new and desire to secure by Letters Patent of the United States is:

1. In a powder mass consisting of discrete particles of metal oxide composition for the preparation of a high temperature fuel cell component, said fuel cell component exhibiting both ionic and electronic conductivity and comprising a first material selected from the group consisting of zirconia and thoria with said first material being stabilized with one or more oxides selected from the group consisting of calcium oxide, yttrium oxide, ytterbium oxide and a mixture of rare earth oxides, and a second material selected from the group consisting of iron oxide, cobalt oxide, nickel oxide, titanium oxide, zinc oxide, titanium oxide-iron oxide, zinc oxide-iron oxide and zinc oxide-lead oxide, the improvement comprising the discrete particles each being substantially spherically-shaped agglomerates substantially uniform in composition with respect to the requisite component metal oxides.

2. In the preparation of a powder mass consisting of discrete particles of metal oxide composition for the preparation of a high temperature fuel cell component, said fuel cell component exhibiting both ionic and electronic conductivity and comprising a first material selected from the group consisting of zirconia and thoria with said first material being stabilized with one or more oxides selected from the group consisting of calcium oxide, yttrium oxide, ytterbium oxide, and a mixture of rare earth oxides, and a second material selected from the group consisting of iron oxide, cobalt oxide, nickel oxide, titanium oxide, zinc oxide, titanium oxide-iron oxide, zinc oxide-iron oxide and zinc oxide-lead oxide, the improvement comprising the steps of
    (a) preparing a slurry containing the requisite finely-divided component metal oxides in the desired proportions in a liquid comprising one or more of the group consisting of water and alcohol,
    (b) spray drying said slurry, and
    (c) collecting the mass of discrete particles of agglomerated metal oxides produced therefrom, said particles being substantially uniform in composition and substantially spherical in configuration.

References Cited

UNITED STATES PATENTS 2,976,433   3/1961   Rappaport et al.      252—517
3,219,730   11/1965   Bliton et al.            264—5

OTHER REFERENCES

Fuel Cell Systems, "Westinghouse Solid-Electrolyte Fuel Cell," 1965 (pp. 332–343).

16th Annual Power Sources, "Solid Electrolyte Fuel Cells," 1962 (pp. 34–39).

18th Annual Power Sources, "Solid Electrolyte Batteries," 1964 (pp. 36–40).

Nuclear Science Abstracts, vol. 19, No. 17; NSA–32736, September 1965.

CARL D. QUARFORTH, *Primary Examiner.*

BENJAMIN R. PADGETT, *Examiner.*

S. J. LECHERT, JR., *Assistant Examiner.*